(12) United States Patent
Zhang

(10) Patent No.: US 10,575,141 B2
(45) Date of Patent: *Feb. 25, 2020

(54) GROUP TRIGGER METHOD, APPARATUS, AND SYSTEM

(71) Applicant: Huawei Technologies Co., Ltd., Shenzhen, Guangdong (CN)

(72) Inventor: Wanqiang Zhang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,819

(22) Filed: Mar. 12, 2018

(65) Prior Publication Data
US 2018/0206082 A1 Jul. 19, 2018

Related U.S. Application Data

(63) Continuation of application No. 14/670,205, filed on Mar. 26, 2015, now Pat. No. 9,942,726, which is a
(Continued)

(51) Int. Cl.
*H04W 4/00* (2018.01)
*H04W 4/06* (2009.01)
(Continued)

(52) U.S. Cl.
CPC .............. *H04W 4/06* (2013.01); *H04W 4/08* (2013.01); *H04W 4/14* (2013.01)

(58) Field of Classification Search
CPC ........... H04W 4/06; H04W 4/08; H04W 4/14; H04W 4/20
See application file for complete search history.

(56) References Cited

U.S. PATENT DOCUMENTS

| 8,565,100 | B2 | 10/2013 | Jokimies et al. |
| 8,644,864 | B2 | 2/2014 | Zeira et al. |

(Continued)

FOREIGN PATENT DOCUMENTS

| CN | 102238477 A | 11/2011 |
| CN | 102655667 A | 9/2012 |

OTHER PUBLICATIONS

"3rd Generation Partnership Project; Technical Specification Group Services and System Aspects; Architecture enhancements to facilitate communications with packet data networks and applications (Release 11)"; 3GPP TS 23.682 V11.1.0; Jun. 2012; 27 pages.

(Continued)

*Primary Examiner* — Stephen M D Agosta
(74) *Attorney, Agent, or Firm* — Leydig, Voit & Mayer, Ltd.

(57) ABSTRACT

Disclosed is a group trigger method, apparatus, and system. In embodiments of the present invention, the group trigger system includes: an interworking function (IWF) entity, configured to send a trigger delivery request to an entity that has a trigger function; and the entity that has a trigger function, configured to, after receiving the trigger delivery request sent by the IWF entity, return a trigger delivery acknowledgement message to the IWF entity, and delivers, according to the trigger delivery request, an acquired group trigger payload to a user equipment UE. The entity that has a group trigger function delivers the group trigger payload to the UE, so as to effectively implement group trigger, avoid point-to-point trigger, and save system resources.

8 Claims, 8 Drawing Sheets

Related U.S. Application Data continuation of application No. PCT/CN2012/082179, filed on Sep. 27, 2012.

(51) Int. Cl.
*H04W 4/08* (2009.01)
*H04W 4/14* (2009.01)

(56) References Cited

U.S. PATENT DOCUMENTS

| | | |
|---|---|---|
| 9,049,685 B2 | 6/2015 | Starsinic et al. |
| 2004/0147266 A1 | 7/2004 | Hwang et al. |
| 2004/0185837 A1 | 9/2004 | Kim et al. |
| 2005/0083961 A1 | 4/2005 | Pecen et al. |
| 2006/0109812 A1 | 5/2006 | Kim et al. |
| 2006/0156370 A1 | 7/2006 | Parantainen |
| 2009/0296633 A1 | 12/2009 | Kitahara et al. |
| 2011/0134841 A1 | 6/2011 | Shaheen |
| 2011/0213871 A1 | 9/2011 | DiGirolamo et al. |
| 2012/0004003 A1 | 1/2012 | Shaheen et al. |
| 2012/0163271 A1 | 6/2012 | Kwon et al. |
| 2012/0257571 A1 | 10/2012 | Liao |
| 2013/0053087 A1 | 2/2013 | Li et al. |
| 2013/0080597 A1 | 3/2013 | Liao |
| 2013/0115983 A1 | 5/2013 | Ronneke et al. |
| 2013/0115993 A1 | 5/2013 | Jain et al. |
| 2013/0308564 A1* | 11/2013 | Jain ................ H04B 15/00 370/329 |
| 2014/0050141 A1 | 2/2014 | Ma et al. |

OTHER PUBLICATIONS

"3rd Generation Partnership Project; Technical Specification Group Services and System Aspects;Architecture Enhancements to facilitate communications with Packet Data Networks and Applications; (Release 11)"; 3GPP TS 23.682 V0.1.0; Nov. 2011; 19 pages.

"A solution for Group Based Addressing", Huawei, 3GPP TSG SA WG2 Meeting #79, May 10-14, 2010, 4 pages.

"Analysis of MTC requirements on identifiers", KPN, SA WG2 Meeting #86, Jul. 11-15, 2011, 6 pages.

"3rd Generation Partnership Project; Technical Specification Group Services and System Aspects; System Improvements for Machine-Type Communications (Release 11)", 3GPP TR 23.888 V1 .6.1, Feb. 2012, 166 pages.

"3rd Generation Partnership Project; Technical Specification Group Services and System Aspects; Machine-Type and other Mobile Data Applications Communications Enhancements (Release 12)", 3GPP TR 23.887 V0.2.1, Aug. 2012, 32 pages.

"3rd Generation Partnership Project; Technical Specification Group Services and System Aspects; Architecture enhancements to facilitate communications with packet data networks and applications (Release 11 )", 3GPP TS 23.682 V11.2.0, Sep. 2012, 29 pages.

* cited by examiner

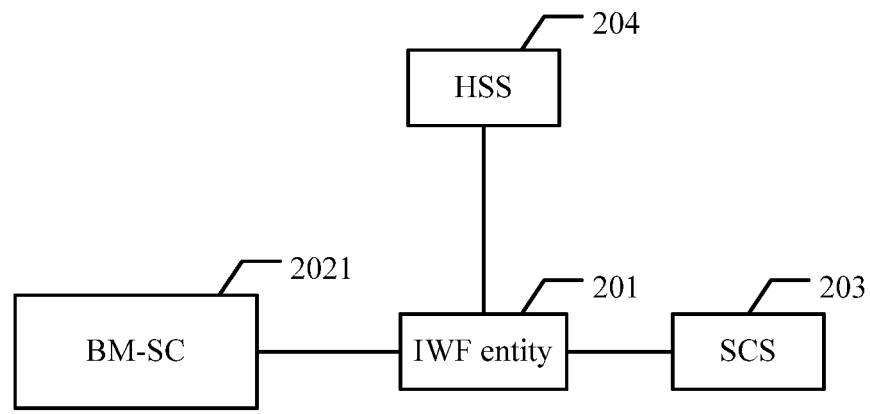
FIG. 3-a
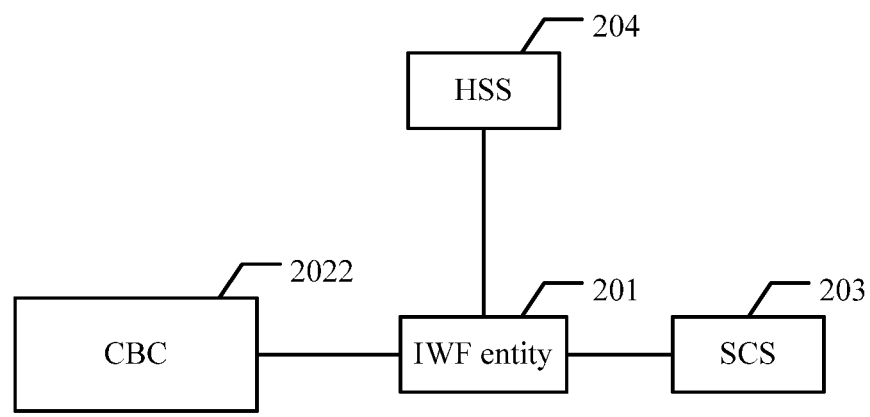
FIG. 3-b

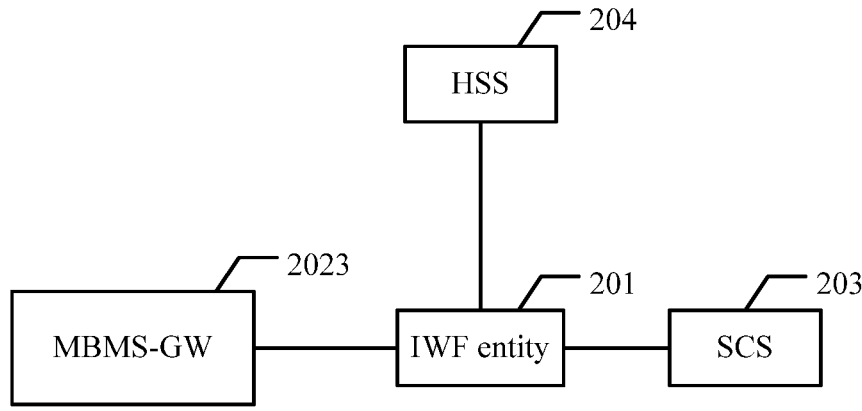
FIG. 3-c
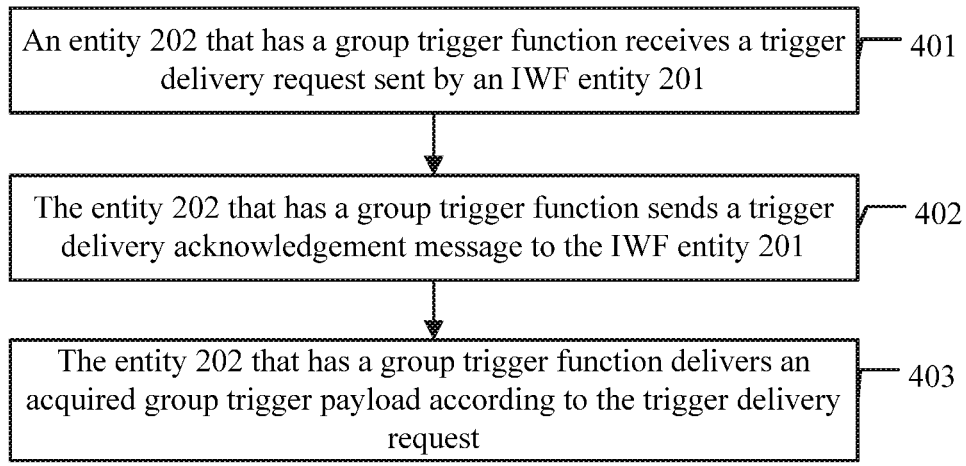
FIG. 4
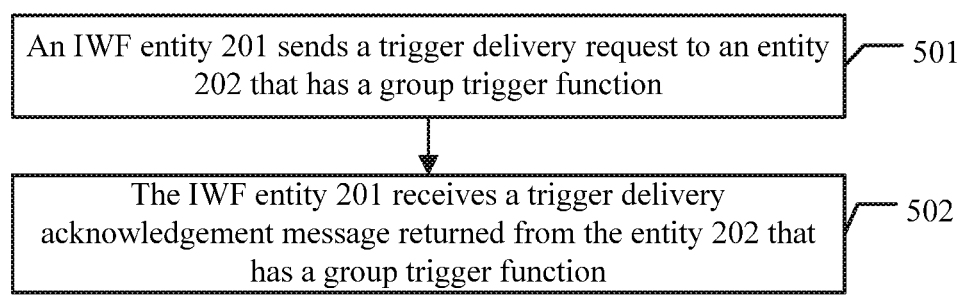
FIG. 5

GROUP TRIGGER METHOD, APPARATUS, AND SYSTEM

CROSS-REFERENCE TO RELATED APPLICATIONS

This application is a continuation of U.S. patent application Ser. No. 14/670,205, filed on Mar. 26, 2015, which is a continuation of International Application No. PCT/CN2012/082179, filed on Sep. 27, 2012. All of the afore-mentioned patent applications are hereby incorporated by reference in their entireties.

TECHNICAL FIELD

Embodiments of the present invention relate to the field of communications technologies, and in particular, to a group trigger method, apparatus, and system.

BACKGROUND

3GPP is currently discussing a trigger feature of a device, and introduces an interworking function (IWF, interworking Function) entity, which is responsible for interworking between an external network and a 3GPP network. FIG. 1 shows a trigger system architecture after the IWF entity is introduced, where the architecture includes the IWF entity, a service capability server (SCS, Services Capability Server), a short message service-service center (SMS-SC, Short Message Service-Service Center), a home subscriber server (HSS, Home Subscriber Server), a mobile switching center (MSC, Mobile Switching Center), a mobility management entity (MME, Mobility Management Entity), a Serving General Packet Radio Service Support Node (SGSN, Serving General packet radio service Support Node), a radio access network (RAN, Radio Access Network), and a user equipment (UE, User Equipment). When the SCS needs to trigger the UE, the SCS delivers a trigger (trigger) request message to the IWF entity; the IWF entity delivers the trigger request message to the SMS-SC after querying subscriber registration information in the HSS; the SMS-SC delivers the trigger request message to a corresponding UE in a manner of sending a short message service message; and the UE establishes, after receiving the trigger request message, a data channel with an external application according to payload included in the trigger request message to perform a corresponding operation.

The trigger manner depends on an SMS message mechanism and is a point-to-point trigger manner, that is, the IWF can trigger only one user equipment (UE, User Equipment) each time. Therefore, when a system needs to trigger a group of UEs, the IWF can respectively send a trigger request message to each UE in the group of UEs only in a point-to-point trigger manner. As a result, a great number of network resources need to be occupied, which causes a waste of network resources.

SUMMARY

Embodiments of the present invention provide a group trigger method, apparatus, and system, so as to perform a group trigger operation and save network resources.

A first aspect of an embodiment of the present invention provides a group trigger system, where the system may include: an interworking function IWF entity, configured to send a trigger delivery request to an entity that has a group trigger function; and the entity that has a group trigger function, configured to, after receiving the trigger delivery request sent by the IWF entity, return a trigger delivery acknowledgement message to the IWF entity, and deliver an acquired group trigger payload to a user equipment UE according to the trigger delivery request.

In a first possible implementation manner, the group trigger system may further include: a service capability server SCS, configured to send a trigger request message to the IWF entity, where the trigger request message includes external group identifier information, location information, and a group trigger payload, so that the IWF entity sends a subscriber information verification request message to a home subscriber server HSS to perform subscriber information verification, where the subscriber information verification request message includes the external group identifier information and identification information of the SCS; and the HSS, configured to, after receiving the subscriber information verification request message sent by the IWF entity, judge, according to the external group identifier information and the identification information of the SCS, whether to perform a trigger operation of the SCS; and if yes, map the external group identifier information to internal group identifier information of an operator, and add the internal group identifier information of the operator and an indication of a determined group trigger delivery manner to a subscriber information verification response message to send to the IWF entity, so that the IWF entity selects a group trigger delivery manner according to the indication of the group trigger delivery manner and/or a local policy to send the trigger delivery request to the corresponding entity that has a group trigger function.

With reference to the first aspect or the first possible implementation manner of the first aspect, the entity that has a group trigger function is broadcast/multicast service center BM-SC, a cell broadcast center CBC, or a multimedia broadcast multicast service gateway MBMS-GW.

A second aspect of the present invention provides a group trigger method, which may include: receiving, by an entity that has a group trigger function, a trigger delivery request sent by an interworking function IWF entity; returning, by the entity that has a group trigger function, a trigger delivery acknowledgement message to the IWF; and delivering, by the entity that has a group trigger function, an acquired group trigger payload to a UE according to the trigger delivery request.

In a first possible implementation manner, if the trigger delivery request includes internal group identifier information of an operator and location information, after the returning, by the entity that has a group trigger function, a trigger delivery acknowledgement message to the IWF, the method further includes: receiving, by the entity that has a group trigger function, the group trigger payload sent by the IWF entity; and if the trigger delivery request includes the internal group identifier information of the operator, the location information, and the group trigger payload, after the returning, by the entity that has a group trigger function, a trigger delivery acknowledgement message to the IWF, the method further includes: acquiring, by the entity that has a group trigger function, the group trigger payload from the trigger delivery request.

A third aspect of the present invention provides a group trigger method, which may include: sending, by an interworking function IWF entity, a trigger delivery request to an entity that has a group trigger function; and receiving, by the IWF entity, a trigger delivery acknowledgement message returned from the entity that has a group trigger function.

In a first possible implementation manner, before the sending a trigger delivery request to an entity that has a group trigger function, the method further includes: receiving a trigger request message sent by a service capability server SCS, where the trigger request message includes external group identifier information, location information, and a group trigger payload; sending a subscriber information verification request message to a home subscriber server HSS according to the trigger request message, where the subscriber information verification request message includes the external group identifier information and identification information of the SCS, so that the HSS determines, according to the external group identifier information and the identification information of the SCS, whether to perform a trigger operation of the SCS; and if yes, the HSS maps the external group identifier information to internal group identifier information of an operator, and adds the internal group identifier information of the operator and an indication of a determined group trigger delivery manner to a subscriber information verification response message to send to the IWF entity; and receiving the subscriber information verification response message.

A fourth aspect of the present invention provides a group trigger apparatus, which may include: a first receiving unit, configured to receive a trigger delivery request sent by an interworking function IWF entity; a sending unit, configured to return a trigger delivery acknowledgement message to the IWF after the first receiving unit receives the trigger delivery request; and a delivery unit, configured to deliver an acquired group trigger payload to a UE according to the trigger delivery request after the sending unit sends the trigger delivery acknowledgement message.

In a first possible implementation manner, if the trigger delivery request includes internal group identifier information of an operator and location information, the group trigger apparatus further includes: a second receiving unit, configured to receive the group trigger payload sent by the IWF entity after the sending unit sends the trigger delivery acknowledgement message to the IWF entity; and if the trigger delivery request includes the internal group identifier information of the operator, the location information, and the group trigger payload, the group trigger apparatus further includes: an acquiring unit, configured to acquire the group trigger payload from the trigger delivery request after the sending unit sends the trigger delivery acknowledgement message to the IWF entity.

A fifth aspect of the present invention provides an IWF entity, which may include: a first sending unit, configured to send a trigger delivery request to an entity that has a group trigger function; and a first receiving unit, configured to receive a trigger delivery acknowledgement message returned from the entity that has a group trigger function after the sending unit sends the trigger delivery request.

In a first possible implementation manner, the IWF entity further includes: a second receiving unit, configured to receive a trigger request message sent by a service capability server SCS, where the trigger request message includes external group identifier information, location information, and a group trigger payload; a second sending unit, configured to send a subscriber information verification request message to a home subscriber server HSS according to the trigger request message after the second receiving unit receives the trigger request message, where the subscriber information verification request message includes the external group identifier information and identification information of the SCS, so that the HSS determines, according to the external group identifier information and the identification information of the SCS, whether to perform a trigger operation of the SCS; and if yes, the HSS maps the external group identifier information to internal group identifier information of an operator, and adds the internal group identifier information of the operator and an indication of a determined group trigger delivery manner to a subscriber information verification response message to send to the IWF entity; and a third receiving unit, configured to receive the subscriber information verification response message after the second sending unit sends the trigger request message to the HSS.

A sixth aspect of the present invention provides a group trigger apparatus, which may include: a receiver, configured to receive a trigger delivery request sent by an interworking function IWF entity; a transmitter, configured to return a trigger delivery acknowledgement message to the IWF after the receiver receives the trigger delivery request; and a processor, configured to deliver an acquired group trigger payload to a UE according to the trigger delivery request after the transmitter sends the trigger delivery acknowledgement message.

In a first possible implementation manner, the group trigger apparatus may further include: a memory, configured to store the internal group identifier information of the operator, the location information, and the group trigger payload.

A seventh aspect of the present invention provides an IWF entity, which may include: a transmitter, configured to send a trigger delivery request to an entity that has a group trigger function; and a receiver, configured to, after the transmitter sends the trigger delivery request, receive a trigger delivery acknowledgement message returned from the entity that has a group trigger function.

In a first possible implementation manner, the receiver is further configured to receive a trigger request message sent by a service capability server SCS, where the trigger request message includes external group identifier information, location information, and a group trigger payload; the IWF entity further includes: a processor, configured to, after the receiver receives the trigger request message, determine, according to the trigger request message, a subscriber information verification request message that is to be sent to a home subscriber server HSS, where the subscriber information verification request message includes the external group identifier information and identification information of the SCS; the transmitter is further configured to send the subscriber information verification request message to the HSS, so that the HSS determines, according to the external group identifier information and the identification information of the SCS, whether to perform a trigger operation of the SCS; and if yes, the HSS maps the external group identifier information to internal group identifier information of an operator, and adds the internal group identifier information of the operator and an indication of a determined group trigger delivery manner to a subscriber information verification response message to send to the IWF entity; and the receiver is further configured to receive the subscriber information verification response message.

With reference to the seventh aspect or the first possible implementation manner of the seventh aspect, the IWF entity further includes: a memory, configured to store the external group identifier information, the location information, the group trigger payload, the internal group identifier information of the operator, and the identification information of the SCS.

It can be learned from the foregoing technical solutions that the embodiments of the present invention have the following advantages:

A group trigger system includes an IWF entity and an entity that has a group trigger function, where the IWF is configured to send a trigger delivery request to the entity that has a group trigger function, so that the entity that has a group trigger function can deliver, after sending a trigger delivery acknowledgement message to the IWF entity, an acquired group trigger payload to a UE according to the trigger delivery request, so as to implement group trigger. In the group trigger system, the entity that has a group trigger function delivers the group trigger payload, which can effectively save network resources.

BRIEF DESCRIPTION OF DRAWINGS

FIG. 3-a is another schematic diagram of an architecture of a group trigger system according to an embodiment of the present invention;

FIG. 3-b is another schematic diagram of an architecture of a group trigger system according to an embodiment of the present invention;

FIG. 3-c is another schematic diagram of an architecture of a group trigger system according to an embodiment of the present invention;

FIG. 4 is a schematic diagram of a group trigger method according to an embodiment of the present invention;

FIG. 5 is another schematic diagram of a group trigger method according to an embodiment of the present invention;

DESCRIPTION OF EMBODIMENTS

Embodiments of the present invention provide a group trigger method, apparatus, and system, so as to implement group trigger and save network resources.

Figure 2:
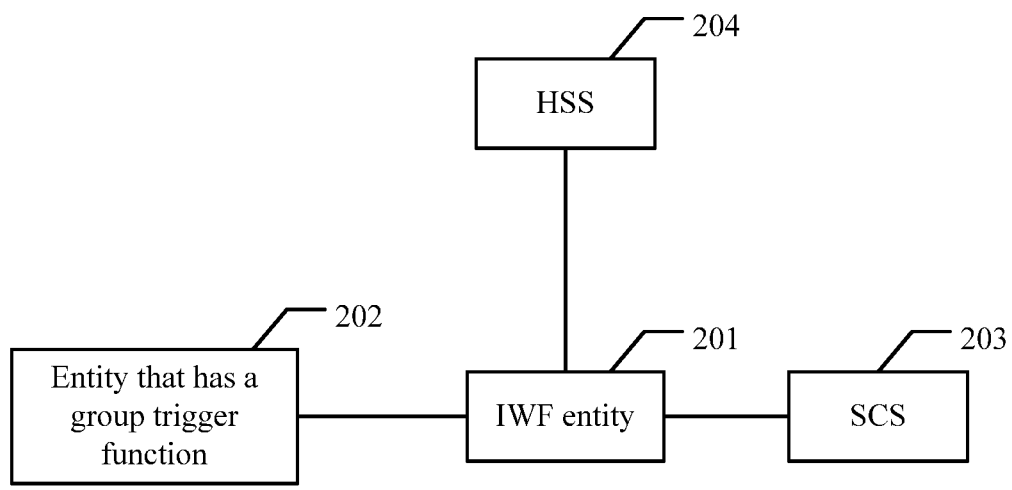
FIG. 2 is a schematic diagram of an architecture of a group trigger system according to an embodiment of the present invention.

To make technical solutions in the present invention more comprehensible, reference is made to FIG. 2. FIG. 2 is a schematic diagram of an architecture of a group trigger system according to an embodiment of the present invention; and the system includes:

an IWF entity 201, configured to send a trigger delivery request (submit trigger request) to a corresponding entity 202 that has a group trigger function; and the entity 202 that has a group trigger function, configured to, after receiving the trigger delivery request sent by the IWF entity 201, return a trigger delivery acknowledgement message to the IWF entity 201 and deliver, according to the trigger delivery request, an acquired group trigger payload to a UE.

Figure 1:
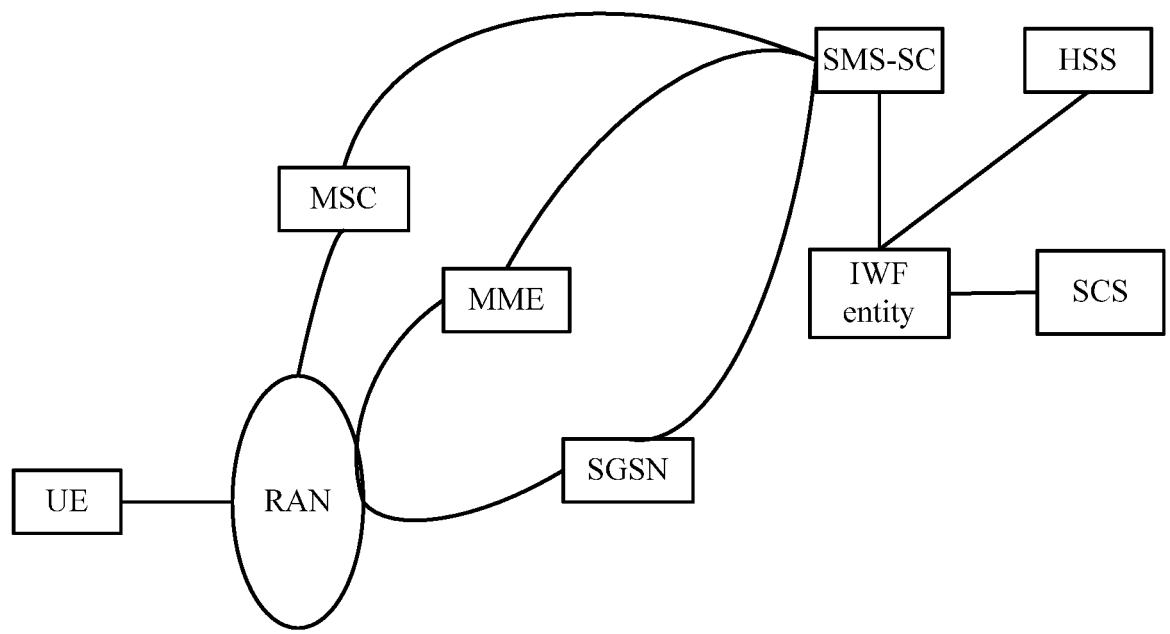
FIG. 1 is a schematic diagram of an architecture of a group trigger system according to an embodiment of the present invention.

It should be noted that the IWF entity in this embodiment of the present invention is based on the trigger system architecture shown in FIG. 1; after the IWF entity 201 sends the trigger delivery request to the corresponding entity 202 that has a group trigger function, the entity 202 that has a group trigger function delivers the acquired group trigger payload to the UE according to the received trigger delivery request; and in this embodiment of the present invention, the group trigger system further includes:

an SCS203, configured to send a trigger request message to the IWF entity 201, where the trigger request message includes external group identifier information (external group identifier), location information (location information), and the group trigger payload (group trigger payload), so that the IWF entity 201 sends a subscriber information verification request (subscriber information request) message to an HSS204 to implement subscriber information verification, where the subscriber information verification request message includes the external group identifier information and identification information of the SCS; and the HSS204, configured to, after receiving the subscriber information verification request message sent by the IWF entity 201 determine, according to the external group identifier information and identification information of the SCS203, whether to perform a trigger operation of the SCS203; and if the trigger operation of the SCS203 is to be performed, map the external group identifier information to internal group identifier information (internal group identifier) of an operator, and add the internal group identifier information of the operator and a determined trigger delivery manner (Trigger Delivery Method) indication message to a subscriber information verification response (subscriber information response) message to send to the IWF entity 201, so that the IWF entity 201 selects a group trigger delivery manner according to the indication of the group trigger delivery manner and/or a local policy to send the trigger delivery request to a corresponding entity that has a group trigger function.

In this embodiment of the present invention, the entity 202 that has a group trigger function may be a broadcast multicast service center whose interface is expanded (BM-SC, Broadcast Multicast Service Centre), a cell broadcast center (CBC, Cell Broadcast Center), or a multimedia broadcast/multicast service gateway (MBMS-GW, Multimedia Broadcast/Multicast Service-GateWay).

In this embodiment of the present invention, referring to FIG. 3-a, FIG. 3-a is an architecture diagram of a group trigger system in which the entity that has a group trigger function is a BM-SC2021 according to this embodiment of the present invention. An interface is introduced between the IWF entity 201 and the BM-SC2021 and a function of the interface is expanded, so that signaling and/or data transmission can be performed between the BM-SC2021 and the IWF entity 201 to implement group trigger. Referring to FIG. 3-b, FIG. 3-b is an architecture diagram of a group trigger system in which the entity that has a group trigger function is a CBC2022 according to this embodiment of the present invention. An interface is introduced between the CBC2022 and the IWF entity 201 and a function of the interface is expanded, so that signaling and/or data transmission can be performed between the CBC2022 and the IWF entity to implement group trigger. Referring to FIG. 3-c, FIG. 3-c is an architecture diagram of a group trigger system in which the entity that has a group trigger function is an MBMS-GW2023 according to this embodiment of the present invention. An interface is introduced between the IWF entity 201 and the MBMS-GW2023 and a function of the interface is expanded, so that signaling and/or data transmission can be performed between the MBMS-GW2023 and the IWF entity 201 to implement group trigger.

It should be noted that, in this embodiment of the present invention, if it is not specifically noted, a BM-SC2021, a CBC2022, and an MBMS-GW2023 mentioned in the following are all entities whose interfaces are expanded and that can perform signaling and/or data transmission with the IWF entity 201.

It should be noted that, in this embodiment of the present invention, the group trigger system may further simultaneously include two entities that have a group trigger function. For example, the IWF entity 201 in the group trigger system may be simultaneously connected to the BM-SC2021 and the CBC2022, or the IWF entity 201 in the group trigger system is simultaneously connected to the CBC2022 and the MBMS-GW2023. When the IWF entity 201 in the group trigger system is connected to two entities that have a group trigger function, the HSS204 may select one of the two entities that have a group trigger function to determine a group trigger delivery manner indication, and add the determined group trigger delivery manner indication to a subscriber information verification response message to send to the IWF entity. When the IWF entity 201 in the group trigger system is connected to only one entity that has a group trigger function, the HSS204 determines a group trigger delivery manner indication by using the entity that has a group trigger function, and sends the determined group trigger delivery manner indication to the IWF entity 201, and the IWF entity 201 determines a practical group trigger delivery manner according to the received group trigger delivery manner indication and/or a local policy, where the trigger delivery manner may be a multimedia broadcast/multicast service (MBMS, Multimedia Broadcast/Multicast Service) manner or a cell broadcast center (CBS, Cell Broadcast Center) manner; when the trigger delivery manner is the MBMS manner, the IWF entity 201 may send the trigger delivery request to the MBMS-GW2023 or send the trigger delivery request to the BM-SC; and when the trigger delivery manner is the CBS, the IWF entity sends the trigger delivery request to the CBC2022.

In this embodiment of the present invention, the trigger delivery request sent by the IWF entity 201 to the entity 202 that has a group trigger function includes internal group identifier information of an operator and location information, or the trigger delivery request may further include the internal group identifier information of the operator, the location information, or the group trigger information. If the trigger delivery request includes the internal group identifier information of the operator and the location information but does not include the group trigger payload, the entity 202 that has a group trigger function returns a trigger delivery acknowledgement message to the IWF entity 201, so that the IWF entity 201 sends, after receiving the trigger delivery acknowledgement message, the group trigger payload to the entity 202 that has a group trigger function, and the entity that has a group trigger function determines a UE group according to the internal group trigger identification of the operator, delivers the group trigger payload to a UE of the UE group in an area corresponding to the location information. If the trigger delivery request includes the internal group trigger identification of the operator, the location information, and the group trigger payload, the entity 202 that has a group trigger function sends the trigger delivery acknowledgement message to the IWF entity 201, acquires the group trigger payload from the received trigger delivery request, determines the UE group according to the internal group trigger identification of the operator, and delivers the group trigger payload to the UE of the UE group in the area corresponding to the location information. The location information is used to determine the area in which the group triggered UE is located; the internal group identifier information of the operator may be a temporary mobile group identity (TMGI, Temporary Mobile Group Identity) or a message type, so that the entity that has a group trigger function such as the BM-SC2021, the MBMS-GW2023 or the CBC2022 can identify a specific group, thereby initiating delivery of the group trigger payload to a user equipment of the group. Therefore, the entity 202 that has a group trigger function may determine, according to the internal group identifier information of the operator and the location information, the area and the group in which the UE that sends the group trigger payload is located.

In addition, in this embodiment of the present invention, the trigger request message, the trigger delivery request, the subscriber information verification request message, and the subscriber information verification response message may all include a group trigger indication, where the group trigger indication may be adding an information element (IE, Information Element) to the foregoing message or expanding an existing service indication, and the group trigger indication is used to indicate group trigger of multiple UEs instead of trigger of a single UE.

In this embodiment of the present invention, based on an IWF entity 201 in a group trigger system, an entity 202 that has a group trigger function such as a BM-SC2021, a CBC2022, and an MBMS-GW2023 is introduced, so that the IWF entity 201 may send, after receiving a trigger request, a trigger delivery request to the entity 202 that has a group trigger function, and the entity 202 that has a group trigger function delivers an acquired group trigger payload to a UE, so as to effectively save system resources.

Referring to FIG. 4, FIG. 4 is a schematic diagram of a group trigger method according to an embodiment of the present invention; and the method includes:

401. An entity 202 that has a group trigger function receives a trigger delivery request sent by an IWF entity 201.

In this embodiment of the present invention, referring to FIG. 2, an SCS203 may send a trigger request message to an IWF entity 201, where the trigger request message includes external group identifier information, location information, and a group trigger payload, and may further include a group trigger indication. The IWF entity 201 sends a subscriber information verification request message to an HSS204, where the subscriber information verification request message includes the external group identifier information and identification information of the SCS and may further include a group trigger indication, the HSS204 determines, according to the external group identifier information and the identification information of the SCS, whether to perform a group trigger operation of the SCS203. If yes, it indicates that verification succeeds, and the HSS204 converts the external group identification into internal group identifier information of an operator, judges a group trigger delivery manner indication, and adds the internal group identifier information of the operator and an indication of a determined group trigger delivery manner to a subscriber information verification response message to send to the IWF entity 201. In addition, the response message may further include a group trigger indication, and the IWF entity 201 selects a group trigger delivery manner according to the indication of the group trigger delivery manner and/or a local policy to send the trigger delivery request to the corresponding entity 202 that has a group trigger function.

402. The entity 202 that has a group trigger function sends a trigger delivery acknowledgement message to the IWF entity 201.

In this embodiment of the present invention, the entity 202 that has a group trigger function returns, after receiving the trigger delivery request sent by the IWF entity 201, the trigger delivery acknowledgement message to the IWF entity 201.

403. The entity 202 that has a group trigger function delivers an acquired group trigger payload to a UE according to the trigger delivery request.

In this embodiment of the present invention, after receiving the trigger delivery request, the entity 202 that has a group trigger function delivers the acquired group trigger payload to the UE according to the trigger delivery request.

If the trigger delivery request received by the entity 202 that has a group trigger function includes the internal group identifier information of the operator and the location information but does not include the group trigger payload, the entity 202 that has a group trigger function receives, after feeding back the trigger delivery acknowledgement message to the IWF entity 201, the group trigger payload sent by the IWF entity 201. If the trigger delivery request received by the entity 202 that has a group trigger function includes the internal group identifier information of the operator, the location information, and the group trigger payload, the entity 202 may directly acquire the group trigger payload from the trigger delivery request.

In this embodiment of the present invention, the entity that has a group trigger function may be a BM-SC2021, a CBC2022, or an MBMS-GW2023 whose interface is expanded. For details, reference is made to FIG. 3-*a* to FIG. 3-*c*.

In this embodiment of the present invention, an entity 202 that has a group trigger function delivers, after receiving a trigger delivery request sent by an IWF entity 201, an acquired group trigger payload to a UE according to the trigger delivery request, so as to effectively implement group trigger and save system resources.

The embodiment shown in FIG. 4 is a group trigger method described from a side of an entity 202 that has a group trigger function. The following describes the group trigger method from a side of an IWF entity 201. Referring to FIG. 5, FIG. 5 is another schematic diagram of a group trigger method according to an embodiment of the present invention; and the method includes:

501. The IWF entity 201 sends a trigger delivery request to the entity 202 that has a group trigger function.

In this embodiment of the present invention, the IWF entity 201 can send the trigger delivery request to the entity that has a group trigger function.

It should be noted that, in this embodiment of the present invention, before that the IWF entity 201 sends a trigger delivery request to the entity that has a group trigger function, the method further includes: receiving a trigger request message sent by an SCS203, where the trigger request message includes external group identifier information, location information, and a group trigger payload and may further include a group trigger indication. Then, the IWF entity 201 sends a subscriber information verification request message to an HSS204 according to the trigger request message, where the information verification request message includes the external group identifier information and identification information of the SCS203, so that the HSS204 may determine, according to the external group identifier information and the identification information of the SCS203, whether to perform a trigger operation of the SCS203. If yes, the HSS204 maps the external group identifier information to internal group identifier information of an operator, and adds the internal group identifier information of the operator and an indication of a determined group trigger delivery manner to a subscriber information verification response message to send to the IWF entity 201; if no, the HSS204 adds a subscriber information verification failure message to the subscriber information verification response message, and returns the subscriber information verification response message to the IWF entity 201. Therefore, the IWF entity 201 receives the subscriber information verification response message sent by the HSS204. In addition, if the subscriber information verification response message includes the internal group identifier information of the operator and the determined group trigger delivery manner indication, the IWF entity 201 selects a group trigger delivery manner according to the indication of the group trigger delivery manner and/or a local policy to send the trigger delivery request to the corresponding entity that has a group trigger function, where the trigger delivery request includes the internal group identifier information of the operator and location information, or the trigger delivery request includes the internal group identifier information of the operator, location information, and a group trigger payload.

502. The IWF entity 201 receives a trigger delivery acknowledgement message returned from the entity 202 that has a group trigger function.

In this embodiment of the present invention, the entity 202 that has a group trigger function returns, after receiving the trigger delivery request sent by the IWF entity 201, the trigger delivery acknowledgement message to the IWF entity 201.

It should be noted that, in this embodiment of the present invention, if the trigger delivery request sent by the IWF entity in step 501 includes the internal group identifier information of the operator and the location information, the IWF entity further sends the group trigger payload to the entity 202 that has a group trigger function after the step 502. If the trigger delivery request includes the internal group identifier information of the operator, the location information, and the group trigger payload, the entity 202 that has a group trigger function may acquire the group trigger payload from the received trigger delivery request.

In this embodiment of the present invention, the entity 202 that has a group trigger function may determine, according to the internal group identifier information of the operator, a UE group on which group trigger is performed, and deliver the group trigger payload to a UE of the UE group in an area corresponding to the location information.

In this embodiment of the present invention, an IWF entity 201 sends a trigger delivery request to an entity 202 that has a group trigger function, so that the entity that has a group trigger function can deliver a group trigger payload to a UE, so as to implement group trigger and save system resources.

It should be noted that, in this embodiment of the present invention, if, after the HSS204 receives the subscriber information verification request message, the HSS204 determines, according to the subscriber information verification not to perform the group trigger operation of the SCS203, the HSS204 adds the subscriber information failure indication to the subscriber information verification response message and sends the subscriber information verification response message to send to the IWF entity 201. If the subscriber information verification response message that is sent by the HSS204 and received by the IWF entity 201 includes the internal group identifier information of the operator and the indication of the group trigger delivery manner, it indicates that the subscriber information verification succeeds, and the IWF entity 201 may determine, according to the indication of the group trigger delivery manner and/or the local policy, to send the trigger delivery request to a BM-SC2021, a CBC2022, or an MBMS-GW2023, which is separately introduced in the following.

Figure 6:
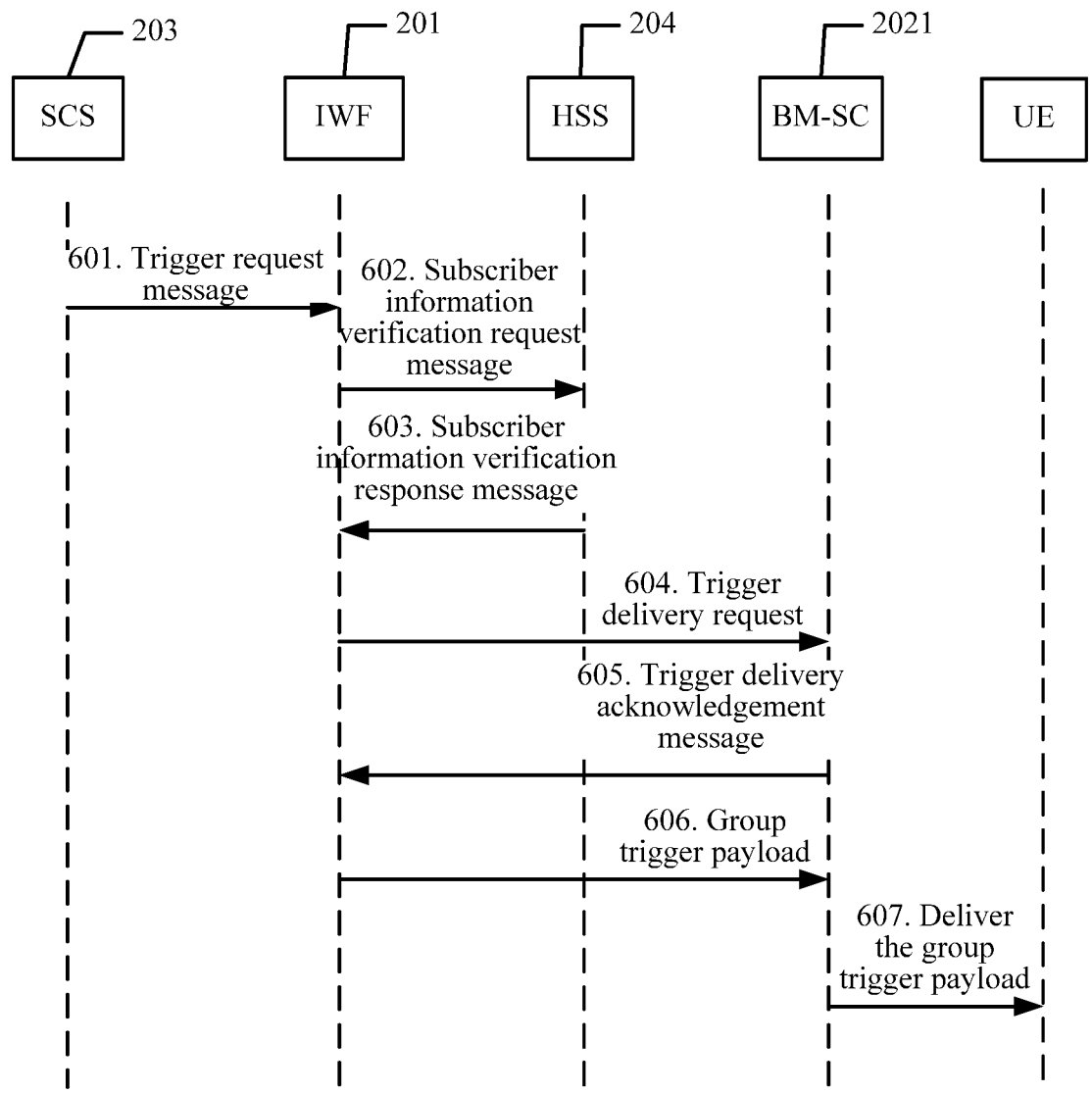
FIG. 6 is another schematic diagram of a group trigger method according to an embodiment of the present invention.

Referring to FIG. 6 and FIG. 3-*a*, FIG. 6 is another schematic diagram of a group trigger method according to an embodiment of the present invention; and the method includes:

601. An SCS203 sends a trigger request message to an IWF entity 201.

In this embodiment of the present invention, the SCS203 sends the trigger request message to the IWF entity 201, where the trigger request message includes external group identifier information, location information, and a group trigger payload, and may further include a group trigger indication.

602. The IWF entity 201 sends a subscriber information verification request message to an HSS204.

In this embodiment of the present invention, the IWF entity 201 sends, after receiving the trigger request message, the subscriber information verification request message to the HSS204, where the subscriber information verification request message includes the external group identifier information and identification information of the SCS203. The HSS204 judges, according to stored subscription information and the identification information of the SCS203, whether the SCS203 has permission to perform group trigger. If yes, it is determined that subscriber information verification of the SCS203 succeeds, and the HSS204 converts the external group identifier information into internal group identifier information of an operator, indicates a trigger delivery manner, and adds the obtained internal group identifier information of the operator and the indication of the group trigger delivery manner to a subscriber information verification response message to send to the IWF entity 201; or, the HSS204 judges, according to subscription information and the identification information of the SCS203, whether the SCS203 has permission to perform group trigger on a group that is corresponding to the external group identifier information. If yes, it is determined that subscriber information verification of the SCS203 succeeds, and the HSS204 converts the external group identifier information into internal group identifier information of an operator, indicates a trigger delivery manner, and adds the obtained internal group identifier information of the operator and the indication of the group trigger delivery manner to a subscriber information verification response message to send to the IWF entity 201. In addition, the subscriber information verification request message and the subscriber information verification response message may further include a group trigger indication.

The internal group identifier information of the operator may be a TMGI, or a message type.

It should be noted that, in this embodiment of the present invention, if the HSS204 determines, according to the subscription information, that the SCS203 does not have group trigger permission; or, the HSS204 determines, according to the subscription information, that the SCS203 has group trigger permission but does not have permission to perform group trigger on the group that is corresponding to the external group identifier information, the subscriber information verification fails and the HSS204 adds a subscriber information verification failure indication to the subscriber information verification response message to feed back to the IWF entity 201.

603. The HSS204 sends a subscriber information verification response message to the IWF entity 201.

In this embodiment of the present invention, the HSS204 sends, if determining that the subscriber information verification of the SCS203 succeeds, the subscriber information verification response message to the IWF entity 201, where the message includes the internal group identifier information of the operator and the indication of the group trigger delivery manner, where the indication of the group trigger delivery manner is used to indicate a group trigger delivery manner such as an MBMS manner or a CBS manner that the can be selected by IWF entity 201.

604. The IWF entity 201 sends a trigger delivery request to a BM-SC2021.

In this embodiment of the present invention, if the indication of the group trigger delivery manner in the subscriber information verification response message received by the IWF entity 201 indicates an MBMS manner, the IWF entity 201 selects the MBMS manner according to the indication and/or a local policy to perform group trigger delivery, and may send the trigger delivery request to the BM-SC2021.

It should be noted that, in this embodiment of the present invention, the trigger delivery request that is sent by the IWF entity 201 to the BM-5C2021 may include internal group identifier information of an operator and location information, or include internal group identifier information of an operator, location information, and a group trigger payload. In addition, the trigger delivery request may further include a group trigger indication. In this embodiment of the present invention, an example in which the trigger delivery request does not include the group trigger payload is described.

605. The BM-SC2021 sends a trigger delivery acknowledgement message to the IWF entity 201.

In this embodiment of the present invention, the BM-SC2021 feeds back, after receiving the trigger delivery request, the trigger delivery acknowledgement message to the IWF entity 201. In addition, it should be noted that the IWF entity 201 may send, after receiving the trigger delivery acknowledgement message fed back by the BM-SC2021, a trigger acknowledgement message to the SCS203, so as to notify that the trigger request from the SCS203 is accepted by a network.

606. The IWF entity 201 sends a group trigger payload to the BM-SC2021.

This embodiment of the present invention is described with the example in which the trigger delivery request does not include the group trigger payload; therefore, the IWF entity 201 may send, after receiving the trigger delivery acknowledgement message, the group trigger payload to the BM-SC2021, so that the BM-SC2021 can implement a group trigger operation.

It should be noted that, in this embodiment of the present invention, if the trigger delivery request includes the group trigger payload, step 606 needs to be modified to that: The BM-SC2021 acquires the group trigger payload from the received trigger delivery request.

607. The BM-SC2021 delivers the group trigger payload to a UE according to the trigger delivery request.

In this embodiment of the present invention, the BM-SC2021 delivers the group trigger payload according to the trigger delivery request, which specifically includes the following: the BM-SC2021 acquires the internal group identifier information of the operator and the location information that are included in the trigger delivery request, determines a user group according to the internal group identifier information of the operator and the location information, and delivers, in the MBMS manner, the group trigger payload to a UE of the user group, so that the UE of the user group performs, after receiving the group trigger payload, a corresponding operation according to the received group trigger payload.

In this embodiment of the present invention, an IWF entity 201 sends, after receiving a trigger request message sent by an SCS203, a subscriber information verification request message to an HSS204. If the received subscriber information verification response message that is fed back by the HSS204 includes internal group identifier information of an operator and a group trigger delivery manner indication, the IWF entity 201 sends a trigger delivery request to a BM-SC2021, and the BM-SC2021 delivers a group trigger payload according to the trigger delivery request to implement a group trigger function. A point-to-point trigger manner does not need to be adopted, so as to effectively save resources.

Figure 7:
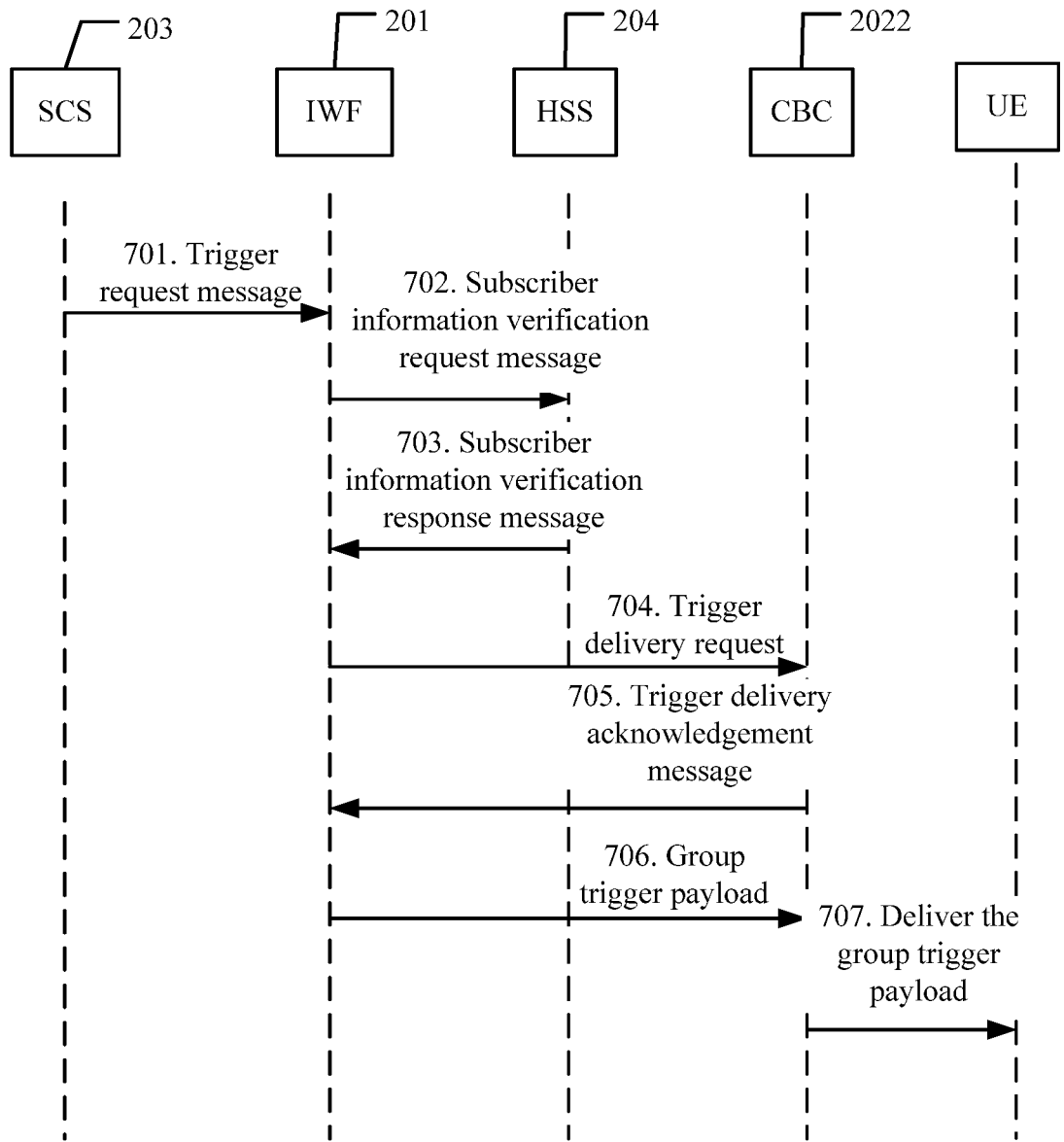
FIG. 7 is another schematic diagram of a group trigger method according to an embodiment of the present invention.

Referring to FIG. 7 and FIG. 3-*b*, FIG. 7 is another schematic diagram of a group trigger method according to an embodiment of the present invention; and the method includes:

701. An SCS203 sends a trigger request message to an IWF entity 201.

702. The IWF entity 201 sends a subscriber information verification request message to an HSS204.

703. The HSS204 sends a subscriber information verification response message to the IWF entity 201.

Content described in step 701 to step 703 is similar to that described in step 601 to step 603 in the embodiment shown in FIG. 5, and details are not described herein again.

704. The IWF entity 201 sends a trigger delivery request to a CBC2022.

In this embodiment of the present invention, if a trigger delivery manner indication in the subscriber information verification response message indicates a CBS manner, the IWF entity 201 sends the trigger delivery request to the CBC2022.

It should be noted that, in this embodiment of the present invention, the trigger delivery request that is sent by the IWF entity 201 to the CBC2022 may include internal group identifier information of an operator and location information, or include internal group identifier information of an operator, location information, and a group trigger payload. In addition, the trigger delivery request may further include a group trigger indication. In this embodiment of the present invention, an example in which the trigger delivery request does not include the group trigger payload is described.

705. The CBC2022 sends a trigger delivery acknowledgement message to the IWF entity 201.

In this embodiment of the present invention, the CBC2022 feeds back, after receiving the trigger delivery request, the trigger delivery acknowledgement message to the IWF entity 201. In addition, it should be noted that the IWF entity 201 may send, after receiving the trigger delivery acknowledgement message fed back by the CBC2022, a trigger acknowledgement message to the SCS203, so as to notify that the trigger request from the SCS203 is accepted by a network.

706. The IWF entity 201 sends a group trigger payload to the CBC2022.

This embodiment of the present invention is described with the example in which the trigger delivery request does not include the group trigger payload; therefore, the IWF entity 201 may send, after receiving the group trigger response message, the group trigger payload to the CBC2022, so that the CBC2022 can implement a group trigger operation.

It should be noted that, in this embodiment of the present invention, if the trigger delivery request includes the group trigger payload, step 706 needs to be modified to that: The CBC2022 acquires the group trigger payload from the received trigger delivery request.

707. The CBC2022 delivers the group trigger payload to a UE according to the trigger delivery request.

In this embodiment of the present invention, the CBC2022 delivers the group trigger payload according to the trigger delivery request, which specifically includes the following: the CBC2022 acquires the internal group identifier information of the operator and the location information that are included in the trigger delivery request, determines a user group according to the internal group identifier information of the operator and the location information, and delivers, in the CBS manner, the group trigger payload to a UE of the user group, so that the UE of the user group performs, after receiving the group trigger payload, a corresponding operation according to the received group trigger payload.

In this embodiment of the present invention, an IWF entity 201 sends, after receiving a trigger request message sent by an SCS203, a subscriber information verification request message to an HSS204. If the received subscriber information verification request message that is fed back by the HSS204 includes internal group identifier information of an operator and a group trigger delivery manner indication, the IWF entity 201 sends a trigger delivery request to a CBC2022, and the CBC2022 delivers an acquired group trigger payload according to the trigger delivery request to implement a group trigger function. A point-to-point trigger manner does not need to be adopted, so as to effectively save resources.

Figure 8:
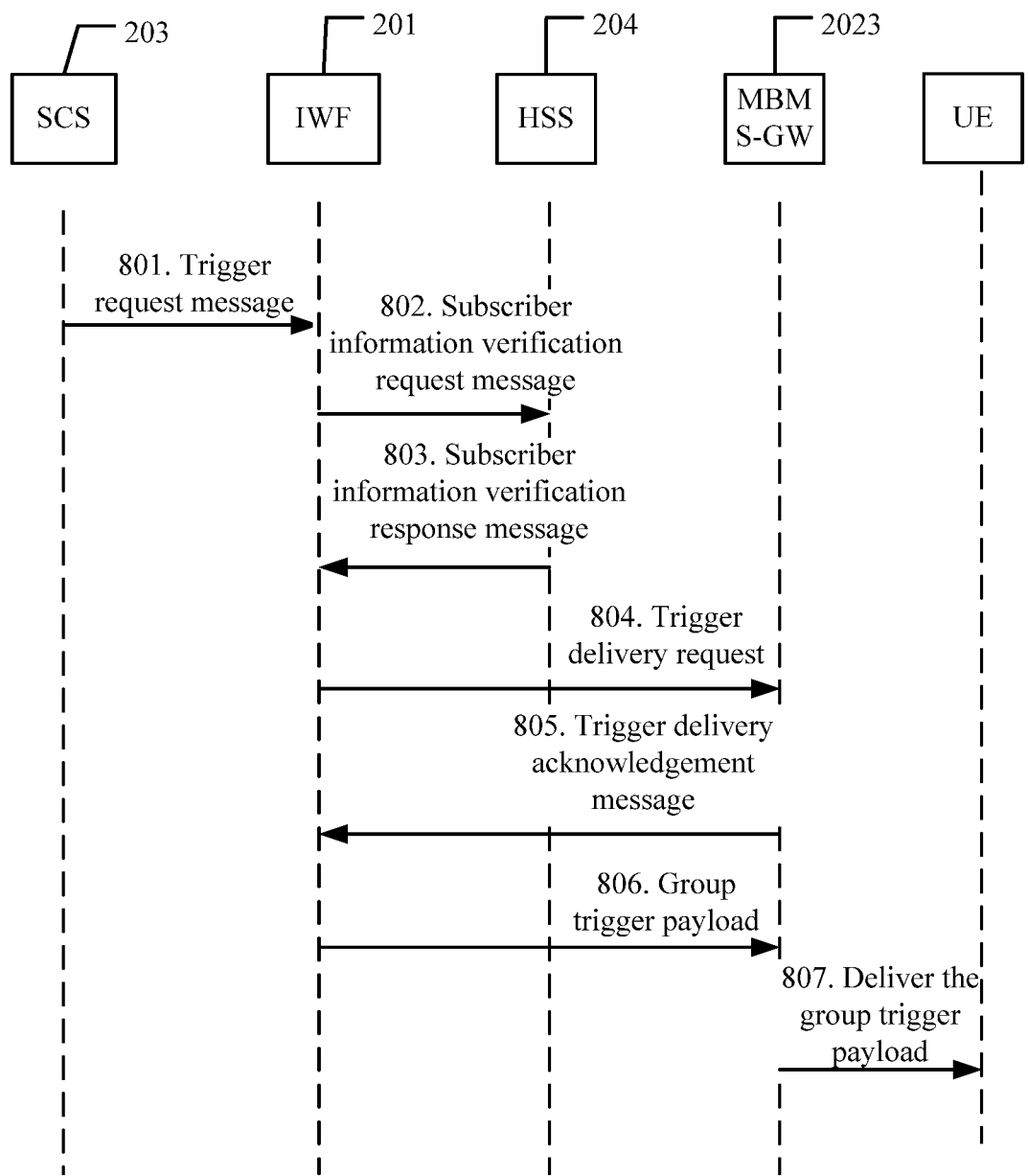
FIG. 8 is another schematic diagram of a group trigger method according to an embodiment of the present invention.

Referring to FIG. 8 and FIG. 3-*c*, FIG. 8 is another schematic diagram of a group trigger method according to an embodiment of the present invention; and the method includes:

801. An SCS203 sends a trigger request message to an IWF entity 201.

802. The IWF entity 201 sends a subscriber information verification request message to an HSS204.

803. The HSS204 sends a subscriber information verification response message to the IWF entity 201.

Content described in step 801 to step 803 is similar to that described in step 601 to step 603 in the embodiment shown in FIG. 5, and details are not described herein again.

804. The IWF entity 201 sends a trigger delivery request to an MBMS-GW2023.

In this embodiment of the present invention, if a group trigger delivery manner indication in the subscriber information verification response message indicates an MBMS manner, the IWF entity 201 may select the MBMS manner according to the indication and/or a local policy to perform group trigger delivery, and may send the trigger delivery request to the MBMS-GW2023.

It should be noted that, in this embodiment of the present invention, the trigger delivery request that is sent by the IWF entity 201 to the MBMS-GW2023 may include internal group identifier information of an operator and location information, or include internal group identifier information of an operator, location information, and a group trigger payload. In addition, the trigger delivery request may further include a group trigger indication. In this embodiment of the present invention, an example in which the trigger delivery request does not include the group trigger payload is described.

805. The MBMS-GW2023 sends a trigger delivery acknowledgement message to the IWF entity 201.

In this embodiment of the present invention, the MBMS-GW2023 feeds back, after receiving the trigger delivery request, the trigger delivery acknowledgement message to the IWF entity 201. In addition, it should be noted that the IWF entity 201 may send, after receiving the trigger delivery acknowledgement message fed back by the MBMS-GW2023, a trigger acknowledgement message to the SCS203, so as to notify that the trigger request message from the SCS203 is accepted by a network.

806. The IWF entity 201 sends a group trigger payload to the MBMS-GW2023.

This embodiment of the present invention is described with the example in which the trigger delivery request does not include the group trigger payload; therefore, the IWF entity 201 may send, after receiving the trigger delivery acknowledgement message, the group trigger payload to the MBMS-GW2023, so that the MBMS-GW2023 can implement a group trigger operation.

It should be noted that, in this embodiment of the present invention, if the trigger delivery request includes the group trigger payload, step 806 needs to be modified to that: The MBMS-GW2023 acquires the group trigger payload from the received trigger delivery request.

807. The MBMS-GW2023 delivers the group trigger payload to a UE according to the trigger delivery request.

In this embodiment of the present invention, the MBMS-GW2023 delivers the group trigger payload according to the trigger delivery request, which specifically includes the following: the MBMS-GW2023 acquires the internal group identifier information of the operator and the location information that are included in the trigger delivery request, determines a user group according to the internal group identifier information of the operator and the location information, and delivers, in the MBMS manner, the group trigger payload to a UE of the user group, so that the UE of the user group performs, after receiving the trigger deliver payload, a corresponding operation according to the received group trigger payload.

In the foregoing embodiments, group trigger is described as an example. The group trigger payload may be regarded as a specific message. For ordinary group message delivery, the foregoing solutions may also be adopted, and details are not described herein again.

In this embodiment of the present invention, an IWF entity 201 sends, after receiving a trigger request message sent by an SCS203, a subscriber information verification request message to an HSS204. If the received subscriber information verification request message that is fed back by the HSS204 includes internal group identifier information of an operator and a group trigger delivery manner indication, the IWF entity 201 sends a trigger delivery request to an MBMS-GW2023, and the MBMS-GW2023 delivers a group trigger payload according to the trigger delivery request to implement a group trigger function. A point-to-point trigger manner does not need to be adopted, so as to effectively save resources.

Figure 9:
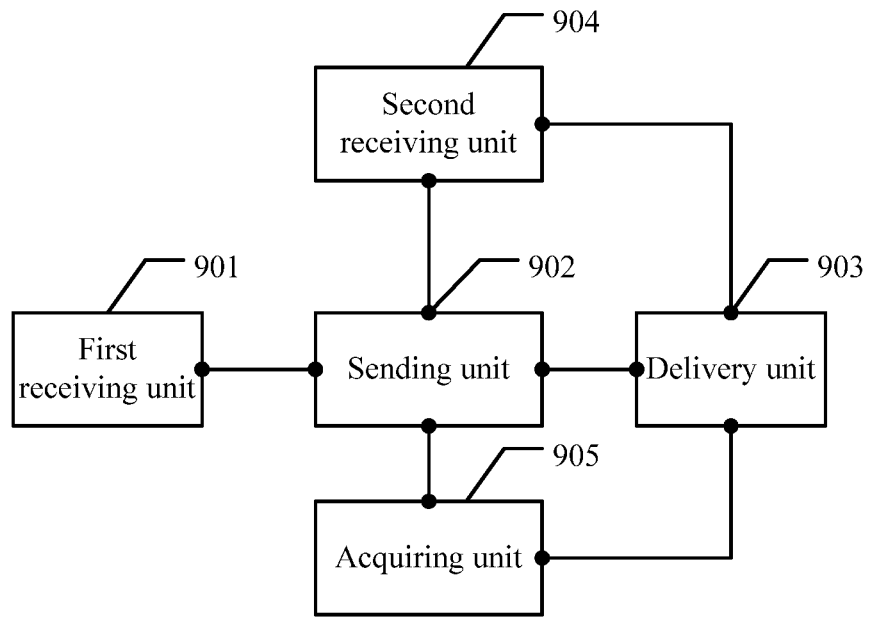
FIG. 9 is a schematic diagram of a group trigger apparatus according to an embodiment of the present invention.

Referring to FIG. 9, FIG. 9 is a schematic diagram of a group trigger apparatus according to an embodiment of the present invention; and the apparatus includes: a first receiving unit 901, configured to receive a trigger delivery request sent by an interworking function IWF entity 201; a sending unit 902, configured to return a trigger delivery acknowledgement message to the IWF entity after the first receiving unit 901 receives the trigger delivery request; and a delivery unit 903, configured to deliver an acquired group trigger payload to a UE according to the trigger delivery request after the sending unit 902 sends the trigger delivery acknowledgement message.

In this embodiment of the present invention, if the trigger delivery request includes internal group identifier information of an operator and location information, the group trigger apparatus further includes: a second receiving unit 904, configured to, after the sending unit 902 sends the trigger delivery acknowledgement message to the IWF entity 201, receive the group trigger payload sent by the IWF entity 201; and if the trigger delivery request includes the internal group identifier information of the operator, the location information, and the group trigger payload, the group trigger apparatus further includes: an acquiring unit 905, configured to acquire the group trigger payload from the trigger delivery request after the sending unit 902 sends the trigger delivery acknowledgement message to the IWF entity 201.

In this embodiment of the present invention, the delivery unit 903 is specifically configured to deliver the group trigger payload to a UE in a corresponding location area according to the internal group identifier information of the operator and the location information after the second receiving unit 904 or the acquiring unit 905 acquires the group trigger payload.

In this embodiment of the present invention, the first receiving unit of the group trigger apparatus receives the trigger delivery request sent by the IWF entity 201, and then the sending unit returns the trigger delivery acknowledgement message to the IWF entity 201. If the trigger delivery request includes the internal group identifier information of the operator and the location information, the second receiving unit 904 receives the group trigger payload sent by the IWF entity; if the trigger delivery request includes the internal group identifier information of the operator, the location information, and the group trigger payload, the acquiring unit 905 acquires the group trigger payload from the trigger delivery request, and then the delivery unit 903 delivers the group trigger payload to the UE in the corresponding location area according to the internal group identifier information of the operator and the location information.

In this embodiment of the present invention, a group trigger apparatus delivers, after receiving a trigger delivery request sent by an IWF entity 201, an acquired group trigger payload to a UE according to the trigger delivery request, so as to effectively implement group trigger and save system resources.

In this embodiment of the present invention, the group trigger apparatus is an entity 202 that has a group trigger function, which may be a broadcast/multicast service center BM-SC, a cell broadcast center CBC, or a multimedia broadcast multicast service gateway MBMS-GW.

Figure 10:
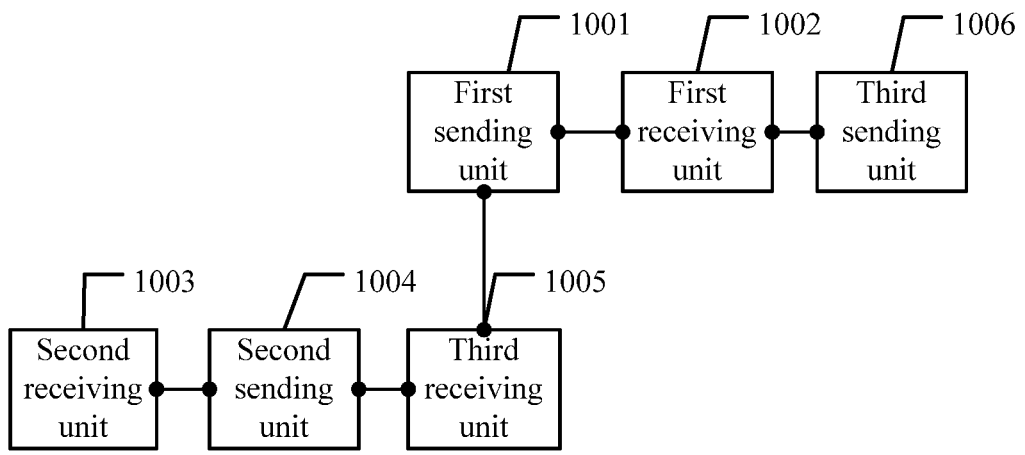
FIG. 10 is a schematic structural diagram of an IWF entity according to an embodiment of the present invention.

Referring to FIG. 10, FIG. 10 is a schematic structural diagram of an IWF entity 201 according to an embodiment of the present invention; and the IWF entity 201 includes: a first sending unit 1001, configured to send a trigger delivery request to an entity 202 that has a group trigger function; and a first receiving unit 1002, configured to, after the sending unit 101 sends the trigger delivery request, receive a trigger delivery acknowledgement message returned from the entity 202 that has a group trigger function.

In this embodiment of the present invention, the IWF entity 201 may further include: a second receiving unit 1003, configured to receive a trigger request message sent by a service capability server SCS203, where the trigger request message includes external group identifier information, location information, and a group trigger payload; a second sending unit 1004, configured to, after the second receiving unit 1003 receives the trigger request message, send a subscriber information verification request message to a home subscriber server HSS204 according to the trigger request message, where the subscriber information verification request message includes the external group identifier information and identification information of the SCS203, so that the HSS determines, according to the external group identifier information and the identification information of the SCS203, whether to perform a trigger operation of the SCS203; and if yes, the HSS204 maps the external group identifier information to internal group identifier information of an operator, and adds the internal group identifier information of the operator and an indication of a determined group trigger delivery manner to a subscriber information verification response message to send to the IWF entity 201; and a third receiving unit 1005, configured to receive the subscriber information verification response message after the second sending unit 1004 sends the trigger request to the HSS204.

The first sending unit 1001 is specifically configured to select a trigger delivery manner according to the indication of the group trigger delivery manner and/or a local policy to send the trigger delivery request to the corresponding entity 202 that has a group trigger function, where the trigger delivery request includes the internal group identifier information of the operator and location information; the IWF entity 201 further includes: a third sending unit 1006, configured to send the group trigger payload to the entity 202 that has a group trigger function after the first receiving unit 1002 receives the trigger delivery acknowledgement message.

The first sending unit 1001 is specifically configured to select a group trigger delivery manner according to the indication of the group trigger delivery manner and/or a local policy to send the trigger delivery request to the corresponding entity 202 that has a group trigger function, where the trigger delivery request includes the internal group identifier information of the operator, the location information, and the group trigger payload.

In this embodiment of the present invention, a second receiving unit 1003 receives a trigger request message sent by an SCS 203, where the trigger request message includes external group identifier information, location information, and a group trigger payload. Then, a second sending unit 1004 sends a subscriber information verification request message to an HSS204 according to the trigger request message, where the subscriber information verification request message includes the external group identifier information and identification information of the SCS203, so that the HSS204 determines, according to the external group identifier information and the identification information of the SCS203, whether to perform a trigger operation of the SCS203. If yes, the HSS204 maps the external group identifier information to internal group identifier information of an operator, and adds the internal group identifier information of the operator and an indication of a determined group trigger delivery manner to a subscriber information verification response message to send to the IWF entity 201; a third receiving unit 1005 in the IWF entity 201 receives the subscriber information verification response message; and then the first sending unit 1001 selects a group trigger delivery manner according to the indication of the group trigger delivery manner and/or a local policy to send the trigger delivery request to the corresponding entity 202 that has a group trigger function; and the first receiving unit 1002 receives a returned trigger delivery acknowledgement message. If the trigger delivery request sent by the first sending unit 1001 includes the internal group identifier information of the operator and the location information but does not include the group trigger payload, the third sending unit 1006 sends, after the first receiving unit 1002 receives the trigger delivery acknowledgement message, the group trigger payload to the entity 202 that has a group trigger function; and if the trigger delivery request sent by the first sending unit 1001 includes the internal group identifier information of the operator, the location information, and the group trigger payload, the group trigger payload does not need to be separately sent, and the entity 202 that has a group trigger function can deliver the group trigger payload to a UE in a corresponding location area according to the internal group identifier information of the operator and the location information, so as to implement group trigger and save system resources.

Figure 11:
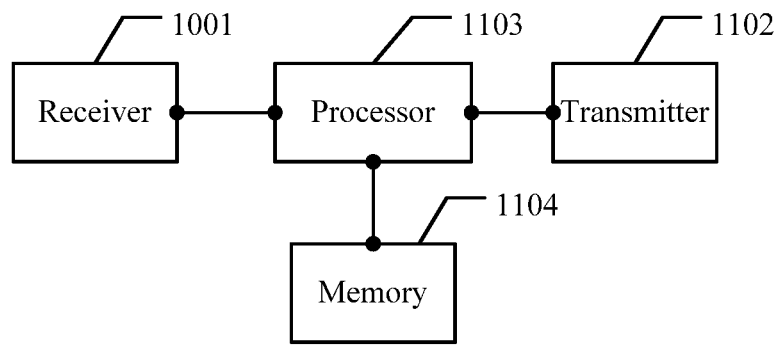
FIG. 11 is a schematic diagram of a group trigger apparatus according to an embodiment of the present invention.

Referring to FIG. 11, FIG. 11 is a schematic diagram of a group trigger apparatus according to an embodiment of the present invention; and the apparatus includes: a receiver 1101, configured to receive a trigger delivery request sent by an IWF entity 201; a transmitter 1102, configured to return a trigger delivery acknowledgement message to the IWF entity after the first receiving unit 1101 receives the trigger delivery request; and a processor 1103, configured to deliver an acquired group trigger payload to a UE according to the trigger delivery request after the transmitter 1102 sends the trigger delivery acknowledgement message.

In this embodiment of the present invention, if the trigger delivery request includes internal group identifier information of an operator and location information, the receiver 1101 is further configured to, after the transmitter 1102 sends the trigger delivery acknowledgement message to the IWF entity 201, receive the group trigger payload sent by the IWF entity 201; and if the trigger delivery request includes the internal group identifier information of the operator, the location information, and the group trigger payload, the processor 1103 is further configured to acquire the group trigger payload from the received trigger delivery request.

In this embodiment of the present invention, the group trigger apparatus may further include: a memory 1104, configured to store the internal group identifier information of the operator, the location information, and the group trigger payload.

It should be noted that, in this embodiment of the present invention, the group trigger apparatus is the entity 202 that has a group trigger function, which may be a BM-SC, a CBC, or an MBMS-GW whose interface is expanded.

In this embodiment of the present invention, a receiver 1101 in a group trigger apparatus receives a trigger delivery request sent by an IWF entity 201, and then a transmitter 1102 sends a trigger delivery acknowledgement message to the IWF entity 201. If the trigger delivery request received by the receiver 1101 includes a group trigger payload, a processor 1103 acquires the group trigger payload from the trigger delivery request, and delivers, according to internal group identifier information of an operator and location information, the acquired group trigger payload to a UE; if the trigger delivery request received by the receiver 1101 does not include the group trigger payload, the IWF entity 201 sends, after receiving the trigger delivery acknowledgement message, the group trigger payload to the group trigger apparatus, so that the receiver 1101 in the group trigger apparatus receives the group trigger payload, and the processor 1103 delivers, according to the internal group identifier information of the operator and the location information, the acquired group trigger payload to the UE to implement group trigger, which avoids a problem that group trigger in a point-to-point manner brings about a waste of resources, so as to effectively save resources.

Figure 12:
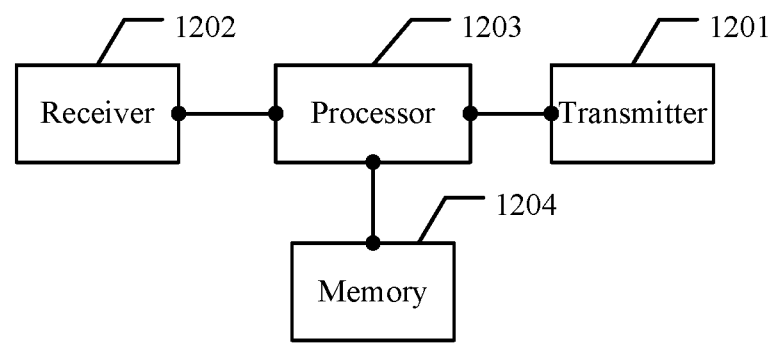
FIG. 12 is a schematic diagram of an IWF entity according to an embodiment of the present invention.

Referring to FIG. 12, FIG. 12 is a schematic structural diagram of an IWF entity 201 according to an embodiment of the present invention; and the IWF entity 201 includes: a transmitter 1201, configured to send a trigger delivery request to an entity 202 that has a group trigger function; and a receiver 1202, configured to, after the transmitter 1201 sends the trigger delivery request, receive a trigger delivery acknowledgement message returned from the entity 202 that has a group trigger function.

Preferably, in this embodiment of the present invention, the receiver 1202 is further configured to receive a trigger request message sent by a service capability server SCS203, where the trigger request message includes external group identifier information, location information, and a group trigger payload;

In this embodiment of the present invention, the IWF entity 201 may further include: a processor 1203, configured to, after the receiver 1202 receives the trigger request message, determine, according to the trigger request message, a subscriber information verification request message that is to be sent to a home subscriber server HSS204, where the subscriber information verification request message includes the external group identifier information and identification of the SCS203; the transmitter 1201 is further configured to send the subscriber information verification request message to the HSS204, so that the HSS204 determines, according to the external group identifier information and the identification information of the SCS203, whether to perform a trigger operation of the SCS203; and if yes, the HSS204 maps the external group identifier information to internal group identifier information of an operator, and adds the internal group identifier information of the operator and an indication of a determined group trigger delivery manner to a subscriber information verification response message to send to the IWF entity 201; and the receiver is further configured to receive the subscriber information verification response message.

In this embodiment of the present invention, if the trigger delivery request sent by the transmitter 1201 includes the internal group identifier information of the operator and the location information, the transmitter 1201 sends, after the receiver 1202 receives the trigger delivery acknowledgement message, the group trigger payload to the entity 202 that has a group trigger function; or, the trigger delivery request sent by the transmitter 1201 includes the internal group identifier information of the operator, the location information, and the group trigger payload.

In this embodiment of the present invention, the IWF entity 201 may further include: a memory 1204, configured to store the external group identifier information, the location information, the group trigger payload, the internal group identifier information of the operator, and the identification information of the SCS203.

In this embodiment of the present invention, a receiver 1202 receives a trigger request message sent by an SCS203, where the trigger request message includes external group identifier information, location information, and a group trigger payload. Then, a processor 1203 determines, according to the trigger request message, a subscriber information verification request message that is to be sent to an HSS204, and a transmitter 1201 sends the subscriber information verification request message to the HSS204, where the subscriber information verification request message includes the external group identifier information and identification information of the SCS203, so that the HSS204 determines, according to the external group identifier information and the identification information of the SCS203, whether to perform a trigger operation of the SCS203. If yes, the HSS204 maps the external group identifier information to internal group identifier information of an operator, and adds the internal group identifier information of the operator and an indication of a determined group trigger delivery manner to a subscriber information verification response message to send to an IWF entity 201. The receiver 1202 in the IWF entity 201 receives the subscriber information verification response message; the transmitter 1201 sends a trigger delivery request to an entity 202 that has a group trigger function; the receiver 1202 receives, after the trigger delivery request is sent, a trigger delivery request message returned from the entity 202 that has a group trigger function. If the trigger delivery message sent by the transmitter 1201 includes the internal group identifier information of the operator and the location information, the transmitter 1201 further sends, after the receiver 1202 receives the trigger delivery acknowledgement message, the group trigger payload to the entity 202 that has a group trigger function. If the trigger delivery message sent by the transmitter 1201 includes the internal group identifier information of the operator, the location information, and the group trigger payload, the transmitter 1201 does not need to separately send the group trigger payload; the entity 202 that has a group trigger function may acquire the group trigger payload from the trigger delivery request and deliver, according to the internal group identifier information of the operator and the location information, the group trigger payload to a UE in a corresponding location area, so as to effectively implement group trigger and save system resources.

A person of ordinary skill in the art may understand that all or a part of the steps of the methods in the embodiments may be implemented by a program instructing relevant hardware. The program may be stored in a computer readable storage medium. The storage medium may include a read-only memory, a magnetic disk, or an optical disc.

The foregoing describes in detail a group trigger system, method, and apparatus provided in the present invention. With respect to the implementations and the application scope, modifications may be made by a person of ordinary skill in the art according to the idea of the embodiments of the present invention. Therefore, this specification shall not be construed as a limitation on the present invention.

What is claimed is:
1. A group trigger system, comprising:
an interworking function (IWF) entity;
a broadcast/multicast service center (BM-SC);
a server capability server (SCS);
a home subscriber server (HSS);

wherein the SCS is configured to send a group message request to the IWF entity, wherein the group message request comprises external group identifier information, location information, and a group trigger payload for enabling the IWF entity to send a subscriber information verification request message to the HSS to perform subscriber information verification;

wherein the HSS is configured to;
  after receiving the subscriber information verification request message sent by the IWF entity, determine to perform a trigger operation of the SCS, and when the HSS determines to perform the trigger operation of the SCS:
    map the external group identifier information to internal group identifier information of an operator, and
    add the internal group identifier information of the operator and an indication of a determined group trigger delivery manner to a subscriber information verification response message to send to the IWF entity;

wherein the interworking function (IWF) entity is configured to:
  transmit the trigger delivery request to the BM-SC, wherein the trigger delivery request comprises an internal group identifier information of an operator and location information, wherein the internal group identifier is a group ID associated with more than one user equipment, and
  select a group trigger delivery manner according to an indication of the trigger delivery manner and/or a local policy to send the trigger delivery request to the corresponding entity that has a group trigger function; and wherein the BM-SC is configured to:
  after receiving the trigger delivery request sent by the IWF entity, transmit a trigger delivery acknowledgement message to the IWF entity,
  receive a group trigger payload sent by the IWF entity after transmitting the trigger delivery acknowledgement message, and
  transmit an acquired group trigger payload to the more than one user equipments according to the trigger delivery request.

2. The group trigger system of claim 1, wherein the BM-SC is configured to transmit the acquired group trigger payload to the more than one user equipments at a corresponding location area according to the internal group identifier information of the operator and the location information of the trigger delivery request.

3. The group trigger system of claim 1, wherein at least one of the trigger delivery request or the subscriber information verification request message further comprise a group trigger indication.

4. An interworking function (IWF) entity, comprising:
  a receiver configured to receive a group message request comprising external group identifier information, location information, and a group trigger payload;
  a transmitter configured to:
    transmit a trigger delivery request to a broadcast/multicast service center (BM-SC), wherein the trigger delivery request comprises an internal group identifier information of an operator and location information, and wherein the internal group identifier is a group ID associated with more than one user equipment;

wherein the receiver is further configured to, after transmitting the trigger delivery request, receive a trigger delivery acknowledgement message returned from the BM-SC;

wherein the transmitter is configured to:
  send a subscriber information verification request message to a home subscriber server (HSS) for enabling the HSS to determine whether to map external group identifier information to the internal group identifier information of the operator, and for enabling the HSS to determine whether to add the internal group information of the operator and an indication of a determined group trigger delivery manner to a subscriber information verification response message to send to the IWF entity, and
  transmit the group trigger payload to the BM-SC, wherein the IWF entity group trigger payload is configured to transmit to the more than one user equipments in a corresponding location area according to the internal group identifier information of the operator and the location information; and a processor configured to select a group trigger delivery manner according to an indication of the trigger delivery manner or a local policy to send the trigger delivery request to a corresponding entity that has a group trigger function.

5. The IWF entity of claim 4, wherein at least one of the trigger delivery request, the trigger request message, the subscriber information verification request message, or the subscriber information verification response message further comprise a group trigger indication.

6. A group trigger system, comprising:
  an interworking function (IWF) entity;
  a server capability server (SCS) configured to send a group message request comprising external group identifier information, location information, and a group trigger payload; and
  an interworking function (IWF) entity configured to:
    receive the group request message sent by the SCS;
    select a group trigger delivery manner according to an indication of the trigger delivery manner or a local policy to send the trigger delivery request to a corresponding entity that has a group trigger function; and
    send a subscriber information verification request message to a home subscriber server (HSS);

wherein the HSS is configured to:
  after receiving the subscriber information verification request message sent by the IWF entity, determine to perform a trigger operation of the SCS,
  when the HSS determines to perform the trigger operation of the SCS:
    map the external group identifier information to internal group identifier information of an operator, and
    add the internal group identifier information of the operator and an indication of a determined group trigger delivery manner to a subscriber information verification response message, and
  send the subscriber information response message to the IWF entity;

wherein the IWF entity is configured to:
  transmit a trigger delivery request to a broadcast/multicast service center (BM-SC), wherein the trigger delivery request comprises an internal group identifier information of an operator and location information, and wherein the internal group identifier is a group ID associated with more than one user equipment; and wherein the BM-SC is configured to:
after receiving the trigger delivery request sent by the IWF entity, transmit a trigger delivery acknowledgement message to the IWF entity,
receive a group trigger payload sent by the IWF entity after transmitting the trigger delivery acknowledgement message, and
transmit an acquired group trigger payload to the more than one user equipment according to the trigger delivery request.

7. The group trigger system of claim 6, wherein the BM-SC is configured to transmit the acquired group trigger payload to the more than one user equipments at a corresponding location area according to the internal group identifier information of the operator and the location information of the trigger delivery request.

8. The group trigger system of claim 6, wherein at least one of the trigger delivery request, the trigger request message, the subscriber information verification request message, and the subscriber information verification response message further comprise a group trigger indication.

* * * * *